United States Patent [19]
Glazier

[11] Patent Number: 5,958,194
[45] Date of Patent: Sep. 28, 1999

[54] GAS PERMEABLE ELASTOMER CONTACT LENS BONDED WITH TITANIUM AND/OR OXIDES THEREOF

[76] Inventor: Alan N. Glazier, 16003 Comprint Cir., Gaithersburg, Md. 20877

[21] Appl. No.: 08/933,011

[22] Filed: Sep. 18, 1997

[51] Int. Cl.$^6$ ...................................................... C08F 8/42
[52] U.S. Cl. ................. 204/192.14; 427/558; 525/326.2; 525/330.2; 525/330.6; 525/371; 525/372; 525/475
[58] Field of Search .................. 204/192.14; 427/558; 525/326.2, 330.2, 330.6, 371, 372, 475

[56] References Cited

U.S. PATENT DOCUMENTS

| | | |
|---|---|---|
| 2,717,246 | 9/1955 | Kienle et al. . |
| 3,035,071 | 5/1962 | Haslam . |
| 3,057,822 | 10/1962 | Rust et al. . |
| 3,347,816 | 10/1967 | Krauss et al. . |
| 3,697,475 | 10/1972 | Morris et al. . |
| 4,143,949 | 3/1979 | Chen . |
| 4,246,389 | 1/1981 | LeBoeuf . |
| 4,686,267 | 8/1987 | Ellis et al. . |
| 5,091,204 | 2/1992 | Ratner et al. . |
| 5,310,571 | 5/1994 | Meadows . |

FOREIGN PATENT DOCUMENTS

| | | |
|---|---|---|
| 3407087 | 9/1985 | Germany . |
| 927202 | 5/1963 | United Kingdom . |
| 1205767 | 9/1970 | United Kingdom . |
| 1229608 | 4/1971 | United Kingdom . |

OTHER PUBLICATIONS

Rong Wang et al., "Light–induced amphiphilic surfaces", *Nature*, vol. 388, Jul. 31, 1997, pp. 431 and 432.

*Primary Examiner*—Bernard Lipman
*Attorney, Agent, or Firm*—Richard C. Litman

[57] ABSTRACT

A soft or rigid gas permeable silicon elastomer contact lens bonded with either titanium, titanium monoxide, titanium dioxide, dititanium trioxide, trititanium pentoxide, and mixtures thereof to form contact lens having high oxygen permeability, improved wetting ability, decreased fogging ability, an enhanced self-cleaning characteristic, and decreased transmissibility to ultraviolet radiation. Preferred methods of incorporating the additives is by cationic polymerization of either a coating of or in situ bonding to a silicon polymer resulting in the expression of the additive toward the exterior surface of the chemical matrix of the contact lens. Other bonding methods are electron beam evaporation., sputtering and ion implantation of the titanium additive.

20 Claims, No Drawings

GAS PERMEABLE ELASTOMER CONTACT LENS BONDED WITH TITANIUM AND/OR OXIDES THEREOF

BACKGROUND OF THE INVENTION

1. Field of the Invention

The present invention relates to a rigid or soft gas permeable elastomer contact lens bonded with a titanium or oxide compounds thereof. The oxides of titanium include titanium monoxide (TiO), titanium dioxide ($TiO_2$), dititanium trioxide ($Ti_2O_3$), trititanium pentoxide ($Ti_3O_5$), and mixtures thereof. The tritanium pentoxide species is the preferred entity. The titanium treated lens have high oxygen permeability, an improved wetting ability, a decreased fogging ability, an enhanced self-cleaning characteristic, and a decrease in the transmissibility of ultraviolet radiation.

The method of incorporating the additives is by cationic polymerization of either a coating of or in situ bonding to an elastomeric polymer resulting in the expression of the additive toward the exterior surface of the chemical matrix of the rigid contact lens. Other means of adding the additives to the elastomeric polymer include electron beam evaporation, sputtering and ion implantation Initially, transparent rigid gas permeable contact lenses were based on silicon and methylmethacrylate polymers. Silicon increased the permeability and hydrophobic nature, but decreased. lens flexure, wettability and deposit resistance. Then, fluorine was added to silicon in the form of fluorosilicone acrylate to increase the permeability to oxygen, but bulk and surface properties of the lenses were compromised.

Dk is a measurement of the oxygen permeability of a contact lens. The higher the Dk value, the more oxygen permeable and more desirable the lens becomes. The addition of fluorine and silicon molecules increases the Dk value, but wettability decreases and lens flexure increases. For reduction of lens flexure, polymer chain mobility must be reduced by increasing cross-linkage.

Currently, optometrists continue to use a majority of contact lenses with lower Dk values, e.g., below 50, of silicon acrylate and fluorosilicone acrylate elastomers.

The problem of hydrophobicity with silicone elastomer lenses has been alleviated with surface treatment by plasma and radiation. However, when the contact lens is scratched the hydrophobic interior is exposed. Fogging and lack of protection from ultraviolet radiation of contact lenses are other problems.

There is a need for a contact lens wherein the aforementioned problems are minimized. The present invention is deemed to satisfy that need.

2. Description of the Related Art

The related art describes various compositions for use as contact lens. The art of interest will be discussed in the order of perceived relevance to the present invention.

Rong Wang et al., "Light-induced amphiphilic surfaces", Nature, Vol. 388, Jul. 31, 1997 pp. 431 and 432, describes the increased surface wettability of a glass substrate by coating with a hydrophilic and oleophilic titanium dioxide (anatase) surface and subjecting the composition to ultraviolet irradiation. The coating was first annealed at 773 K. and irradiated to increase the water-contact angle from 72°±1° to 0°±1°. Polycrystals and single crystals of anatase or rutile titanium dioxide were utilized. Long term storage in the dark results in the substitution of oxygen from air for the chemisorbed hydroxyl groups. This reference does not suggest the use of the coating on any other hard non-glass substrate, let alone a medically safe polymeric substrate such as a rigid contact lens.

U.S. Pat. No. 2,717,246 issued on Sep. 6, 1955, to Roy H. Kienle et al. describes a titanium dioxide pigment coated with layers of a hydrous oxide and a polysiloxane useful in printing inks to make them water repellant. This teaching is negative, because the present invention incorporates titanium or its oxide in a polysiloxane and other polymers to increase the wetting property of the rigid lens coating.

U.S. Pat. No. 5,310,571 issued on May 10, 1994, to David Meadows describes a chemical treatment method to improve oxygen permeability through and protein deposition on hydrophilic (soft) and rigid gas permeable contact lenses. The hydrated polymer lens is purged of all water and oxygen, and the lens is treated by a fluorine-containing gas under non-plasma conditions for replacement of all hydrogen atoms in the polymer. This method is distinguished by its reliance on treatment by fluorine in a non-plasma environment and the lack of titanium or oxides thereof.

U.S. Pat. No. 5,091,204 issued on Feb. 25, 1992, to Buddy D. Ratner et al. describes the modification of an intraocular lens made of poly methyl methacrylate by plasma deposition of a gaseous perfluoropropane monomer to deposit an impermeable coating of fluoropolymer on the lens. This patent similarly treats a polymer surface with fluorine to obtain an impermeable coating, but lacks any suggestion for adding titanium or oxides thereof in the present invention.

U.S. Pat. No. 4,143,949 issued on Mar. 13, 1979, to Richard V. Chen describes a process for depositing a hydrophilic polymethacrylate coating having a thickness of 50–20,000 Angstroms on hard and soft contact lens by a plasma glow discharge method with parameters such as a pressure of 100–500 millitorricelli and an electromagnetic frequency of about 15.6 megahertz. This patent does not suggest the addition of titanium or its oxides.

U.S. Pat. No. 4,686,267 issued on Aug. 11, 1987, to Edward J. Ellis et al. describes fluorine containing siloxane polymeric contact lens compositions with a hardness of at least 90 on the Rockwell R scale. This patent does not suggest the addition of titanium or its oxides.

U.S. Pat. No. 3,347,816 issued on Oct. 17, 1967, to Walter Krauss et al. describes the addition of rutile titanium dioxide pigment to polysiloxane for forming glossy coatings of increased thermal stability on sheet metal plates. There is no suggestion for coating contact lens.

U.S. Pat. No. 3,697,475 issued on Oct. 10, 1972, to Horton H. Morris et al. describes a white thermoplastic paper containing an organo titanate compound having use in laminates, non-woven fabric and rug backing. There is no suggestion for coating contact lens.

Germany Patent No. 3,407,087 issued on Sep. 5, 1985, to Gottfried Phillipp et al. describes a scratch resistant coating for metal, plastics, ceramic, wood or glass obtained by hydrolytic condensation of titanium or zirconium compounds and organo-silane compounds. There is no suggestion for coating contact lens.

U.S. Pat. No. 4,246,389 issued on Jan. 20, 1981 to Albert R. LeBoeuf describes a soft contact lens composition based on acrylic siloxanes having increased oxygen permeability. There is no suggestion for adding titanium or oxides thereof to the soft contact lens.

U.S. Pat. No. 3,057,822 issued on Oct. 9, 1962, to John B. Rust et al. describes organo silicon-titanium copolymers which have high temperature and pressure resistance. The product is useful as laminating resins, insulating varnishes, and filler materials. There is no suggestion for adding to contact lenses.

U.S. Pat. No. 3,035,071 issued on May 15, 1962 to John H. Haslam describes a titanium acylate silicone copolymer useful as coating compositions, lubricating oil detergents, and water repellents. There is no suggestion for adding to contact lenses.

U.K. Patent Application No. 1,205,767 published on Sep. 16, 1970, for the National Patent Development Corporation describes non-fogging coatings for glass or plastics material such as a camera lens. The coating composition comprises a homopolymer of a water-soluble hydroxy-alkyl acrylate or hydroxy-alkyl methacrylate, or a copolymer of a major amount of the water-soluble hydroxyalkyl acrylate or hydroxyalkyl methacrylate and a minor amount of a polyfunctional cross-linking monomer which are hydrophilic. There is no suggestion for coating contact lenses.

U.K. Patent Application No. 927,202 published on May 29, 1963, for the Dow Corning Corporation describes polymethyl methacrylate and silicone rubber contact lenses more hydrophilic by coating with a protein or a polysaccharide. There is no teaching for adding titanium or oxides thereof to the lenses.

U.K. Patent No. Application No. 1,229,608 published on Apr. 28, 1971, for the Dow Corning Corporation describes rubber elastomers for contact lenses. There is no teaching for adding titanium or oxides thereof to the lenses.

The organic polymers described by the relevant art are hereby incorporated by reference herein.

None of the above inventions and patents, taken either singularly or in combination, is seen to describe the instant invention as claimed. Thus, a soft or rigid oxygen gas permeable silicon elastomer contact lens with enhanced wetting and cleaning ability, and decreased fogging and transmissibility of ultraviolet radiation will be shown solving the aforementioned problems.

SUMMARY OF THE INVENTION

The present invention is directed to an improved soft or rigid contact lens containing a permeable elastomer composition bonded with either titanium, titanium monoxide, titanium dioxide, dititanium trioxide, trititanium pentoxide, and mixtures thereof. The titanium additives promote the unexpected chemical properties of (1) a high oxygen permeability, (2) an improved wetting ability, (3) a decreased fogging ability, (4) an enhanced self-cleaning characteristic, and (5) a decrease in the transmissibility of ultraviolet radiation.

The methods of incorporating the titanium additive is preferably either by cationic polymerization of either a coating of titanium or in situ bonding of titanium to an elastomeric polymer resulting in the expression of the titanium additive toward the exterior surface of the chemical matrix of the contact lens. Other means of adding the titanium additive to the elastomeric polymer include ion beam evaporation, sputtering and ion implantation.

Accordingly, it is a principal object of the invention to provide a soft or rigid elastomer contact lens containing bonded titanium or oxides thereof.

It is another object of the invention to provide a soft or rigid elastomer contact lens containing bonded titanium or oxides thereof which is highly permeable to oxygen.

It is a further object of the invention to provide a soft or rigid elastomer contact lens containing bonded titanium or oxides thereof which has improved wettability.

Still another object of the invention is to provide a soft or rigid elastomer contact lens containing bonded titanium or oxides thereof which has a decreased fogging characteristic.

Yet another object of the invention is to provide a soft or rigid elastomer contact lens containing bonded titanium or oxides thereof which has an increased self-cleaning characteristic.

Still another object of the invention is to provide a soft or rigid elastomer contact lens containing bonded titanium or oxides thereof which has a decreased transmissibility of ultraviolet radiation.

It is an object of the invention to provide improved elements and arrangements thereof in a soft or rigid gas permeable elastomer contact lens bonded with titanium or oxides thereof for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The present invention is directed to a soft or rigid elastomeric contact lens which has incorporated either as a coating and/or covalent bonding of titanium and/or its oxides, i.e., titanium monoxide, titanium dioxide, dititanium trioxide, trititanium pentoxide, and mixtures thereof. The method of incorporation of the titanium species into any of the following elastomeric polymers is performed as shown by the cited art of interest above. Also, incorporation of the titanium species into contact lens by conventional electron beam sputtering and ion implantation techniques utilized in the semiconductor processing art are considered alternative methods within the ambit of the present invention. The reaction temperatures would depend on the specific elastomer employed, and would be within the skill of one with ordinary skill in the art without undue experimentation.

Some suitable lens substrates are cellulose acetate butyrate, fluorocarbon, fluoroester, fluoroether, fluorosilicate, fluorosilicon, fluorosilicon acrylate, fluorosiloxane, fluoro-siloxane acrylate, silicate acrylate, siloxane acrylate, silicon elastomers, silicone-acrylate containing different silicone-methacrylate monomers in different proportions, silicone resin, styrene copolymers, and siloxane methacrylate.

The configurations of contact lenses that can be treated include bifocal, bullseye, cosmetic and gas permeable. Trademark registered contact lenses which can be treated include ACHIEVEMENT, MENICON, OXYLITE, and UNIFLEX.

An example of producing the present invention is the electron beam evaporation of trititanium pentoxide to deposit titanium monoxide onto a contact lens substrate of a fluoro-siloxane acrylate. The trititanium pentoxide is evaporated from tantalum crucible by an electron beam at a substrate temperature of 200–300° C. and a reactor pressure of $2 \times 10^{-4}$ Torr. Oxygen is supplied to the reactor at a partial pressure in a range of 5 to $10 \times 10^{-5}$ Torr. The thicknesses of anatase titanium monoxide deposited display refractive indices such as 450 nanometers for 2.4, 500 nm. for 2.35, 700 nm. for 2.26, and 1000–2000 nm. for 2.20. It should be noted that trititanium pentoxide produces only titanium monoxide on evaporation, whereas titanium monoxide, dititanium trioxide and titanium dioxide will create a vapor composed of various titanium and oxygen combinations which change as the evaporation continues. The coated contact lens is then exposed to ultraviolet light to create a hydrophilic and oleophilic surface.

It is to be understood that the present invention is not limited to the embodiments described above, but encompasses any and all embodiments within the scope of the following claims.

I claim:

1. A gas permeable elastomer contact lens bonded with titanium comprising:

a gas permeable elastomer contact lens consisting of an elastomer composition selected from the group consisting of a silicon elastomer, a fluoroelastomer, a fluorosilicon elastomer, a cellulose acetate butyrate, and styrene copolymers; and a predetermined amount of a bonded additive selected from the group consisting of titanium, titanium monoxide, titanium dioxide, dititanium trioxide, trititanium pentoxide, and mixtures thereof, said additive being bonded homogeneously by cationic polymerization with said gas permeable elastomer contact lens, followed by exposure to ultraviolet light to obtain a hydrophilic and an oleophilic surface.

2. The elastomer contact lens according to claim 1, said contact lens being a silicon elastomer selected from the group consisting of silicate acrylate, siloxane acrylate, silicone resin, and siloxane methacrylate.

3. The elastomer contact lens according to claim 1, said contact lens being a fluoro elastomer selected from the group consisting of fluoroester, fluoroether and fluorocarbon.

4. The elastomer contact lens according to claim 1, said contact lens being a fluorosilicon elastomer selected from the group consisting of fluorosilicate, fluorosilicon acrylate, fluoro-siloxane siloxane, and fluoro-siloxane acrylate.

5. The elastomer contact lens according to claim 1, said contact lens being an elastomer selected from the group consisting of cellulose acetate butyrate and styrene copolymers.

6. The elastomer contact lens according to claim 1, said bonded additive selected from the group consisting of titanium, titanium monoxide, and titanium dioxide.

7. The elastomer contact lens according to claim 1, said bonded additive selected from the group consisting of dititanium trioxide and trititanium pentoxide.

8. The elastomer contact lens according to claim 1, said bonded additive being bonded by electron beam evaporation.

9. The elastomer contact lens according to claim 1, said additive being bonded by sputtering.

10. The elastomer contact lens according to claim 1, said additive being bonded by ion implantation.

11. A gas permeable elastomer contact lens bonded with titanium comprising:

a gas permeable elastomer contact lens consisting of an elastomer composition selected from the group consisting of a silicon elastomer, a fluoroelastomer, a fluorosilicon elastomer, a cellulose acetate butyrate, and styrene copolymers; and a coating of a predetermined amount of a bonded additive selected from the group consisting of titanium, titanium monoxide, titanium dioxide, dititanium trioxide, trititanium pentoxide, and mixtures thereof, said coating being bonded to said gas permeable elastomer contact lens by exposure to ultraviolet light to obtain a hydrophilic and an oleophilic surface.

12. The elastomer contact lens according to claim 11, said contact lens being a silicon elastomer selected from the group consisting of silicate acrylate, siloxane acrylate, silicone resin, and siloxane methacrylate.

13. The elastomer contact lens according to claim 11, said contact lens being a fluoro elastomer selected from the group consisting of fluoroester, fluoroether and fluorocarbon.

14. The elastomer contact lens according to claim 11, said contact lens being a fluorosilicon elastomer selected from the group consisting of fluorosilicate, fluorosilicon acrylate, fluoro-siloxane, and fluoro-siloxane acrylate.

15. The elastomer contact lens according to claim 11, said contact lens being an elastomer selected from the group consisting of cellulose acetate butyrate and styrene copolymers.

16. The elastomer contact lens according to claim 11, said bonded additive selected from the group consisting of titanium, titanium monoxide, and titanium dioxide.

17. The elastomer contact lens according to claim 11, said bonded additive selected from the group consisting of dititanium trioxide and trititanium pentoxide.

18. The elastomer contact lens according to claim 11, said additive being bonded by electron beam evaporation.

19. The elastomer contact lens according to claim 11, said additive being bonded by sputtering.

20. The elastomer contact lens according to claim 11, said additive being bonded by ion implantation.

* * * * *